US006297920B1

(12) United States Patent
Saito et al.

(10) Patent No.: US 6,297,920 B1
(45) Date of Patent: Oct. 2, 2001

(54) INFORMATION REPRODUCTION APPARATUS

(75) Inventors: Kengo Saito; Kuniko Yamamoto, both of Miyagi (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/294,376

(22) Filed: Apr. 20, 1999

(30) Foreign Application Priority Data

Apr. 24, 1998 (JP) ................................................. 10-115727

(51) Int. Cl.$^7$ ........................................................ G11B 5/09
(52) U.S. Cl. .............................................. 360/53; 369/53.35
(58) Field of Search ......................... 369/54, 59, 32, 369/33, 58, 53.35, 53.36, 47.16, 47.18, 59.23, 59.24, 124.02; 360/53

(56) References Cited

U.S. PATENT DOCUMENTS

| 5,251,077 | 10/1993 | Saitoh ................................. 360/53 |
| 5,349,481 | 9/1994 | Kauffman et al. .................. 360/74.4 |
| 5,590,112 | 12/1996 | Morishima .......................... 369/124 |
| 6,055,216 | * 4/2000 | Shintani .............................. 369/33 |

OTHER PUBLICATIONS

*High–density Magnetic Tape Recording by Non–tracking Method,* T. Himeno and T. Katoku, Journal of Magnetism and Magentic Materials, Jun. 1994, pp. 255–261.
*Towards the Multitrack Digital Video Tape Recorder,* F. Maurice, J. Magn. Soc. JPN, vol. 15, No. s1 (1991), pp. 389–394.

* cited by examiner

*Primary Examiner*—Thang V. Tran
(74) *Attorney, Agent, or Firm*—Jay H. Maioli (57) ABSTRACT

An information reproduction apparatus uses a block storer to store blocks read by a reproduction head tip, and uses an error detector to detect errors in the blocks. The information reproduction apparatus also uses an information corrector to perform information correction, and a multiblock simultaneous reproducer to reduce block restoration time. The information reproduction apparatus uses an output timing adjuster to output information units at a predetermined cycle and in a predetermined order, whereby original information is restored.

5 Claims, 7 Drawing Sheets

INFORMATION REPRODUCTION APPARATUS

BACKGROUND OF THE INVENTION

1. Field of the Invention

The present invention relates to information reproduction apparatuses, and in particular, to an information reproduction apparatus for reproducing original information from a recording medium containing information divided into information units based on which errors can be detected.

2. Description of the Related Art

Information reproduction apparatuses for reproducing information recorded on a tape or disk recording medium include magnetic reproduction apparatuses that use a fixed magnetic head and magnetic tape to perform reproduction by dividing digital signals into blocks, and magnetic or optical reproduction apparatuses that use an optical pickup and optical disk or the like to perform reproduction by dividing digital signals into blocks.

In the magnetic reproduction apparatuses that use a fixed magnetic head and magnetic tape, when an error is detected from data in an information unit in a block used for reproduction, a portion of the magnetic tape on which the block is recorded is played while ignoring the block in which the error was detected and rewinding the magnetic tape, and this step is repeatedly performed until no errors are detected at all from information units in the block.

In the magnetic reproduction apparatuses, track width and the width of the information reading unit (hereinafter referred to as the "head tip") of the magnetic head, has become smaller with recent increases in storage capacity of recording media for information reproduction apparatuses, and the intervals between tracks has decreased. Thus, it is difficult for the head tip to travel on the same track used when recording was performed, particularly when the magnetic tape slightly fluctuates perpendicular to the travelling direction of the magnetic tape.

In particular, in the case of the so-called "multihead-tip, multitrack" magnetic recording apparatus that uses a plurality of reproduction head tips to perform simultaneous reproduction from information units on a plurality of recording tracks, in contrast to the case of a single-head-tip, single-track magnetic recording apparatus, it is almost impossible for the tracking control to simultaneously position all the reproduction head tips so as to maintain correspondence with all the tracks having recordings.

Consequently, errors frequently occur in the information units in a block used for reproduction, and the duration and time elapse (hereinafter referred to as "block restoration time") required to cancel information-unit errors in the block increases further. Accordingly, an information reproduction apparatus that rapidly and stably reproduces original information recorded on a recording medium is in great demand.

As described above, when the magnetic reproduction apparatuses using the fixed magnetic head and the magnetic tape detect an error from a block used for reproduction, they ignore the error-detected block and rewinding the magnetic tape, and this step is performed repeatedly until no errors are detected at all from information units in the block. However, this has a problem in that the block restoration time greatly increases because the repeated reproduction requires a very long time, depending on the conditions of the fixed magnetic head and the magnetic tape.

In addition, the number of times of the reproduction must be repeated varies depending on the conditions of the fixed magnetic head and the magnetic tape. As a result, time intervals of the restored block and restored blocks subsequent to the error-detected block are irregular. Therefore, a problem arises in that the repeated reproduction cannot cope with a case where original information must be restored by outputting reproduced information units at a predetermined cycle and in a predetermined order.

SUMMARY OF THE INVENTION

Accordingly, it is an object of the present invention to provide an information reproduction apparatus in which a block restoration time is even shorter than that in a conventional information reproduction apparatus, even if an error is detected from an information unit in a block used for reproduction, and a condition where information units must be output at a predetermined cycle and in a predetermined order is satisfied.

To this end, the foregoing object is achieved through provision of an information reproduction apparatus for reproducing original information, including an information reader for reading information as blocks composed of a plurality of information units for enabling error detection, from a recording medium on which information divided into the information units is recorded, and for performing control so that the information recorded on the recording medium is read from a selected position; a block storer for storing the blocks read by the information reader; an error detector for detecting an error in each information unit stored in the block storer; and an information corrector in which when an information-unit error in one of the blocks is detected by the error detector, the information corrector uses the information reader to perform re-reading from a position of the one block having the information-unit error, and the information corrector replaces the one block having the information-unit error by performing the re-reading of a corresponding information unit having no error, and outputs the corresponding information unit as reading information from the one block having the information-unit error.

Preferably, the block storer outputs the stored information units in an order recorded on the recording medium and at a predetermined cycle, and includes an output timing adjuster for restoring the original information.

The information reader may include a multiblock simultaneous reproducer for performing playback of the recording medium, on which a plurality of tracks composed of block lines are adjacently arranged.

The information reproduction apparatus may be either a magnetic reproduction apparatus or an optical reproduction apparatus.

According to the present invention, when errors are detected in information units in a block obtained by reproduction, an information reproduction apparatus greatly reduces a block restoration time to be less than that in a conventional information reproduction apparatus by using a block storer to store a block in which an error was detected; and using an information corrector to perform information correction, without simply performing repeated reproduction until no errors are detected. By providing a multiblock simultaneous reproducer to the information reproduction apparatus, the block restoration time can be greatly reduced.

In addition, by using an output timing adjuster, the information reproduction apparatus can cope with the case where the information units of original information must be output at a predetermined cycle and in a predetermined order when the original information is restored.

DESCRIPTION OF THE PREFERRED EMBODIMENT

The present invention can be applied to information reproduction apparatuses that reproduce original information from a tape or disk recording medium containing information divided into information units based on which errors can be detected.

A magnetic reproduction apparatus using a fixed magnetic head and a tape, which is an example of an information reproduction apparatus according to an embodiment of the present invention, is described below with reference to FIGS. 1 to 9.

Figure 1:
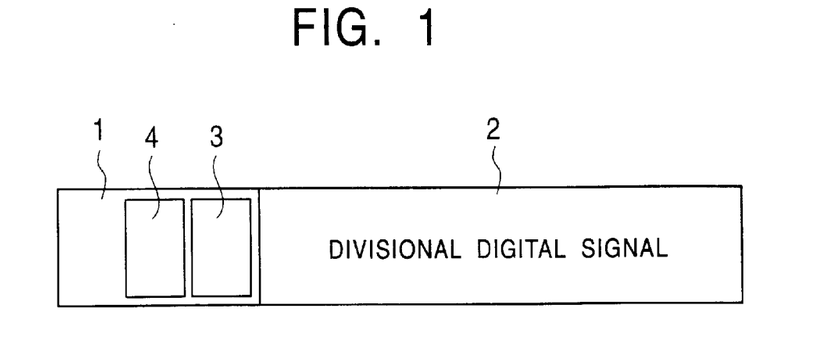
FIG. 1 is a structural drawing showing an information-unit sequence in a block recorded on a recording medium according to the present invention.

FIG. 1 shows an information-unit sequence in a block recorded on the magnetic tape used in the magnetic reproduction apparatus. A header signal 1 includes an information-unit sequence generated by dividing a digital signal as original information, which consists of a divisional digital signal 2, a track number 3, a block number 4, and other information units (not shown) representing the properties of the block, such as the length of the information units.

Figure 2:
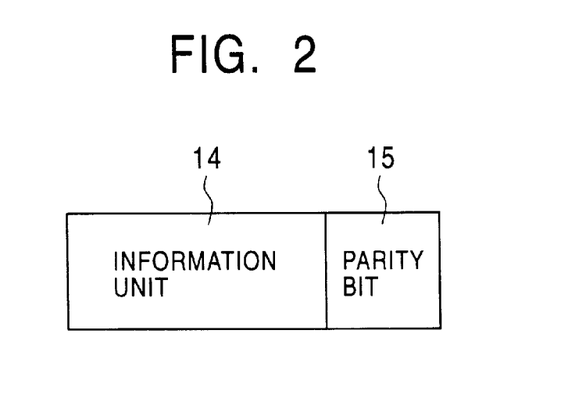
FIG. 2 is a bit-sequence drawing showing an information unit and a parity bit that are used in an information reproduction apparatus of the present invention.

FIG. 2 shows a bit sequence obtained by adding a parity bit 15 for error detection and correction to each of information units 14 in blocks. This bit sequence is used to record each information unit 14 on the magnetic tape. The parity bit 15 is computed based on a bit sequence (shown in FIG. 3) which is composed of an information unit 14 and a track-identification information unit 16 representing a track number. A description of error detection and correction is omitted since the error detection and correction is well known in "Error Control System for Digital Communication and Storage", Prentice Hall, 1995, etc.

Figure 3:
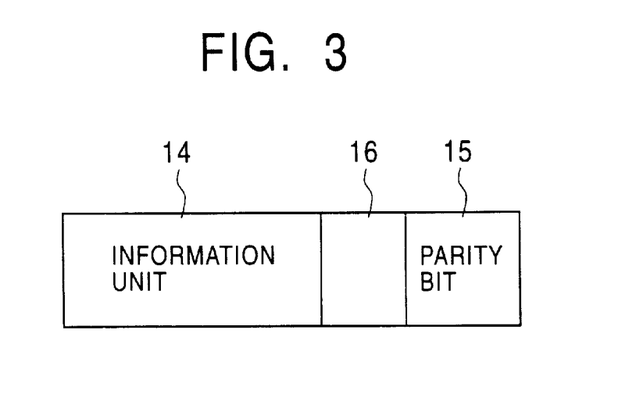
FIG. 3 is a bit-sequence drawing illustrating error detection, error correction, and parity computation in an information reproduction apparatus of the present invention.

The bit sequence (shown in FIG. 2) composed of the information unit 14 and the parity bit 15 are is obtained by reproduction from the magnetic tape, and the track-identification information unit 16 is added to this bit sequence, whereby the bit sequence shown in FIG. 3 is formed and its error detection and correction is performed by an error detector. As described above, the parity bit 15 is computed including the track-identification information unit 16. Thus, the track-identification information unit 16 of the desired track is detected as an error for the information unit 14 and the parity bit 15 of another track. The desired track is represented by the track number 3 in the header signal 1.

Accordingly, if the information unit 14 is appropriately reproduced, when the corresponding track is wrong, such a condition is recognized as an error. Thus, the information unit 14 from a track different from the desired track can be ignored. As a result, it is only required to record only the information unit 14 and the parity bit 15 (shown in FIG. 2), which can increase a recording density.

Figure 4:
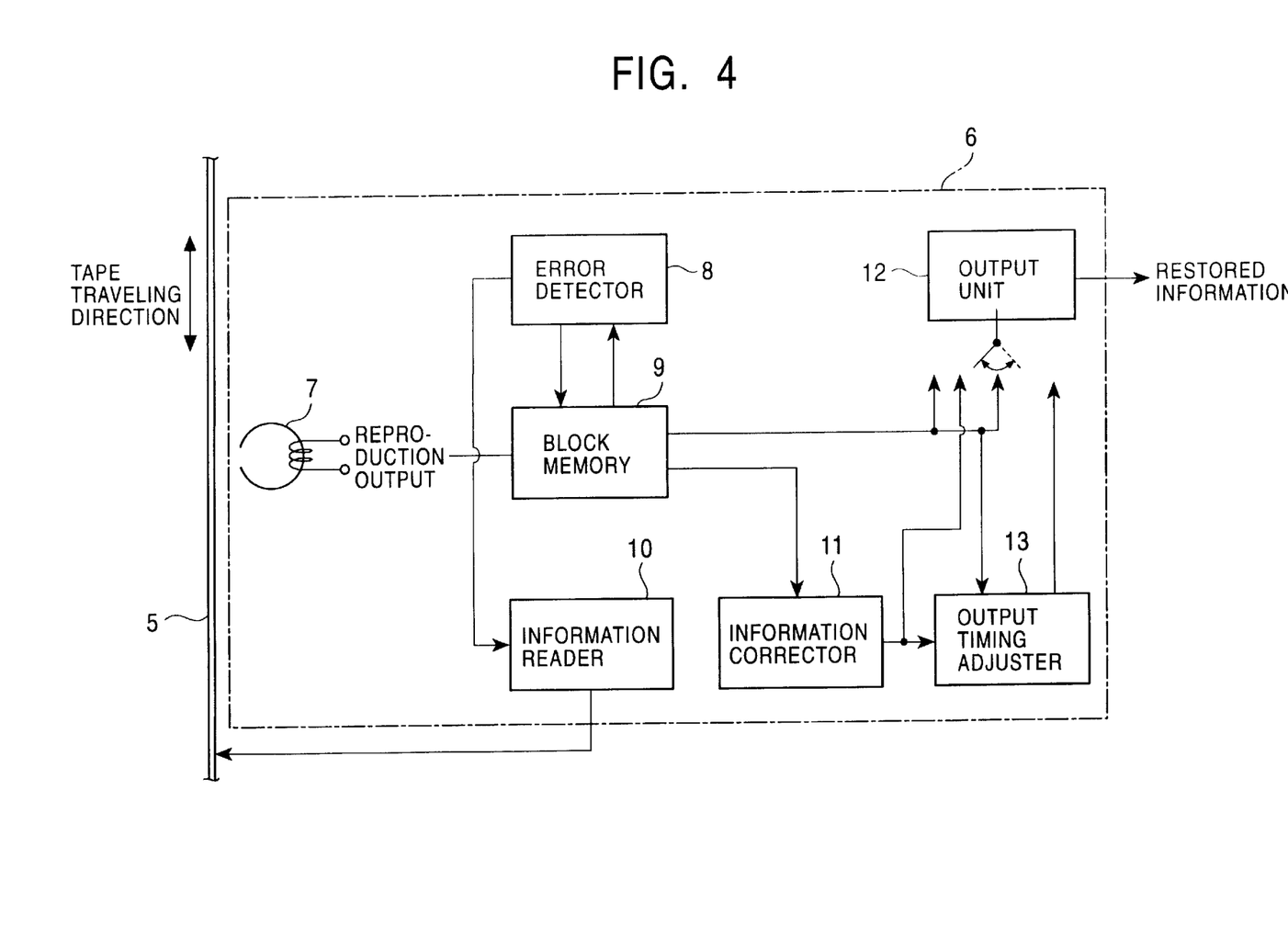
FIG. 4 is a schematic block diagram showing a magnetic reproduction apparatus according to the present invention.

FIG. 4 shows the schematic structure of a magnetic reproduction apparatus 6. A digital signal as original information is divided into blocks, and the information is reproduced from a magnetic tape 5 by a reproduction head tip 7 in a fixed magnetic head.

Figure 5:
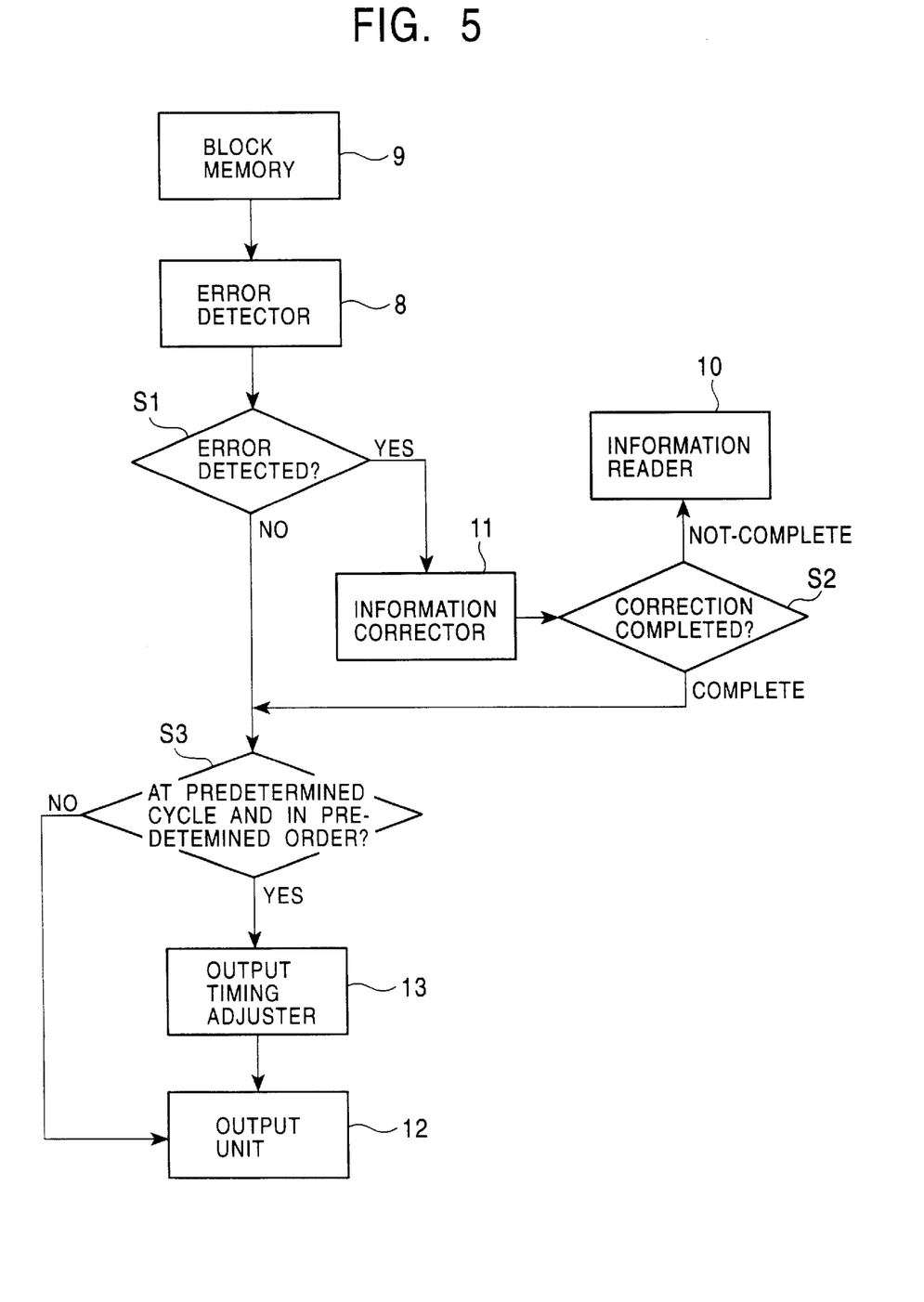
FIG. 5 is a flowchart illustrating a process performed by a magnetic reproduction apparatus according to the present invention.

FIG. 5 is a flowchart showing the operation of the magnetic reproduction apparatus 6. The blocks shown in FIG. 5, that is, an error detector 8, a block memory 9, an information reader 10, an information corrector 11, an output unit 12, and an output adjuster 13, correspond to the identical blocks shown in FIG. 4, respectively.

Referring again to the schematic structure (shown in FIG. 4) of the magnetic reproduction apparatus 6 and the flowchart (shown in FIG. 5) of the operation of the magnetic reproduction apparatus 6, an overall process including the steps of reproducing a block composed of a plurality of information units for enabling error detection from the magnetic tape 5; performing the information correction of the block; performing timing adjustment for the reproduced information; and outputting the reproduced information; is described.

A block read by the reproduction head tip 7 as the information reader 10 of the magnetic reproduction apparatus 6 is stored in the block storer 9, and an information-unit error in the block is detected by the error detector 8. It is preferable that the error detector 8 correct the error. Accordingly, error detection and correction by the error detector 8 is described below.

In FIG. 5, in step S1, the process determines whether in a block in which an information-unit error was detected and corrected by the error detector 8, another information-unit error remains in the block. A block including no information-unit errors is sent to step S3 that determines whether a digital signal as the original information must be output at a predetermined cycle and in a predetermined order, while a block including an information-unit error is sent to the information corrector 11, and information correction is performed. The information corrector 11 is described below.

In step S2, the process uses the information corrector 11 to determine whether correction of information in the block is completed. For an information-corrected block, the determination in step S3 is performed. If the error correction is incomplete, the magnetic tape 5 is rewound by the information reader 10 in order to reproduce the error-detected block, again.

In step S3, the process determines whether timing adjustment is necessary for the outputting of a block as to which the information corrector 11 has determined in step S2 that information correction is complete, and a block as to which the error corrector 8 has determined in step S1 that all information units include no errors. If the output timing adjustment is not necessary, these blocks are sent to the output unit 12. If the output timing adjustment is necessary, these blocks are adjusted to have a predetermined cycle and a predetermined order, and the restored original information is obtained from the output unit 12.

Next, the information corrector 11 is described below with reference to FIGS. 6 and 7.

Figure 6:
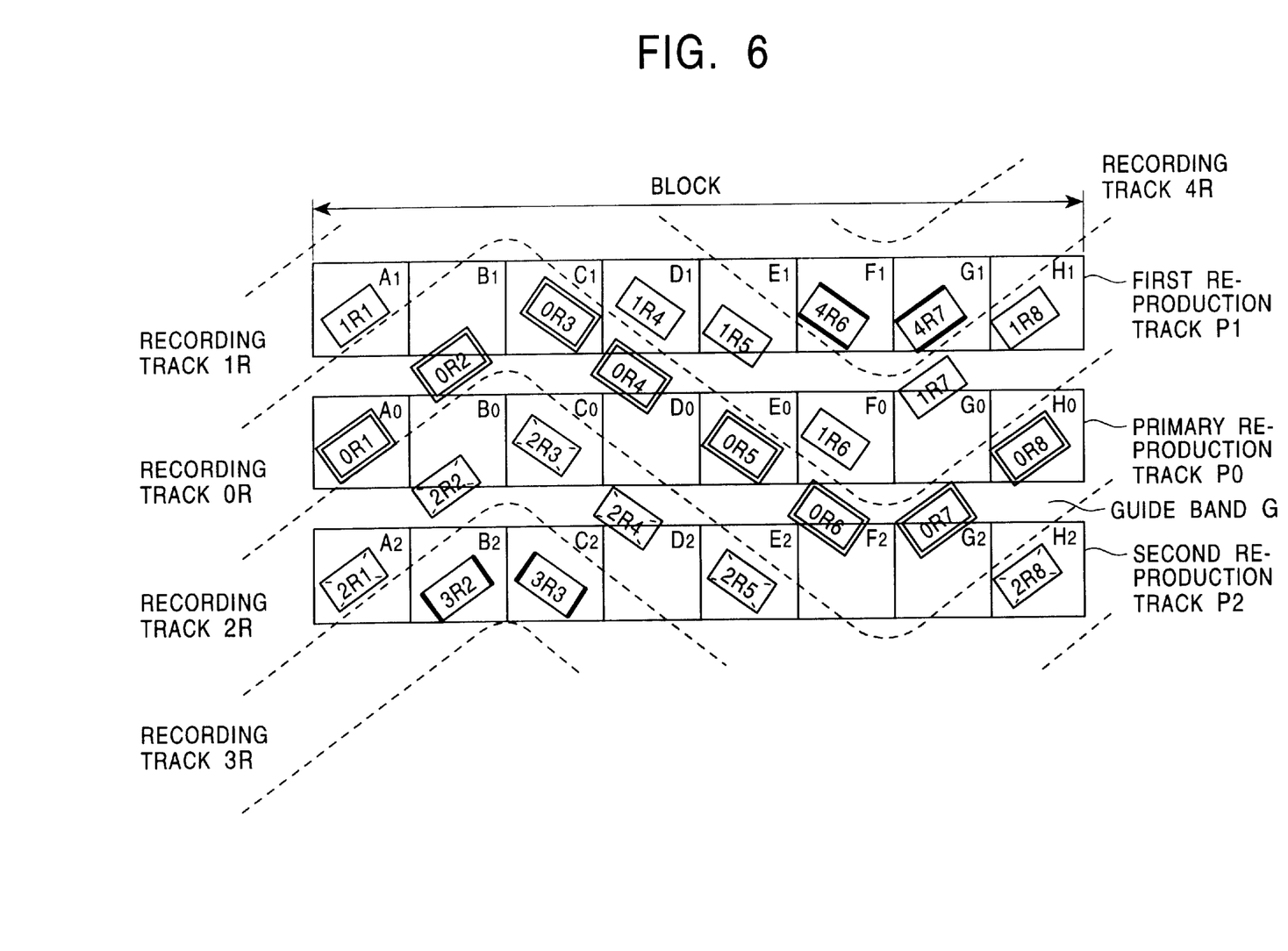
FIG. 6 is a drawing illustrating the principles of an information corrector according to the present invention.

Referring to FIG. 6, recording tracks indicated using chain lines, 0R, 1R, 2R, 3R, and 4R, are tracks recorded on the magnetic tape 5. Rectangles 0R1 to 0R7, 1R1 to 1R7, 2R1 to 2R5, 3R2 to 3R3, and 4R6 to 4R7, schematically indicate bit sequences which are each composed of the information unit 14 and the parity bit 15 recorded on the recording tracks 1R, 2R, 3R, and 4R. Groups of the sequences on the tracks indicate blocks recorded on the tracks 1R, 2R, 3R, and 4R.

Although header signals 1 are not shown in FIG. 6, bit sequences, 0RI, 1R1, 2R1, and 3R1 which are schematically indicated by the first rectangles may be regarded as the header signals 1. The solid lines are used to indicate tracks from which magnetic reproduction is performed. Magnetically reproducible areas A0 to H0, A1 to H1, and A2 to H2, lie on a primary reproduction track P0, a first re-reproduction track P1, and a second re-reproduction track P2, respectively.

The position of the reproduction tip 7 in the magnetic reproduction apparatus 6 (shown in FIG. 4) in the widthwise direction of the magnetic tape 5 is initially adjusted so that the primary reproduction track P0 corresponds to the desired recording track 0R. When the magnetic reproduction apparatus 6 performs re-reproduction along the first and second re-reproduction tracks P1 and P2, the position of the reproduction tip 7 in the widthwise direction of the magnetic tape 5 is fine-adjusted with respect to the first and second re-reproduction tracks P1 and P2, as shown in FIG. 6.

As indicated by the chain lines shown in FIG. 6, the recording track 0R on the magnetic tape 5 does not always correspond to the primary reproduction track P0 because the magnetic tape 5 meanders with respect to the reproduction head tip 7. In particular, in the case where the width of each recording track on the magnetic tape 5 or the width of the reproduction head tip 7 has become smaller, or the intervals between tracks has greatly decreased, the above-described problem frequently occurs, and reproduced information units include errors, particularly when the magnetic tape 5 slightly fluctuates perpendicular to its travelling direction.

Figure 7:
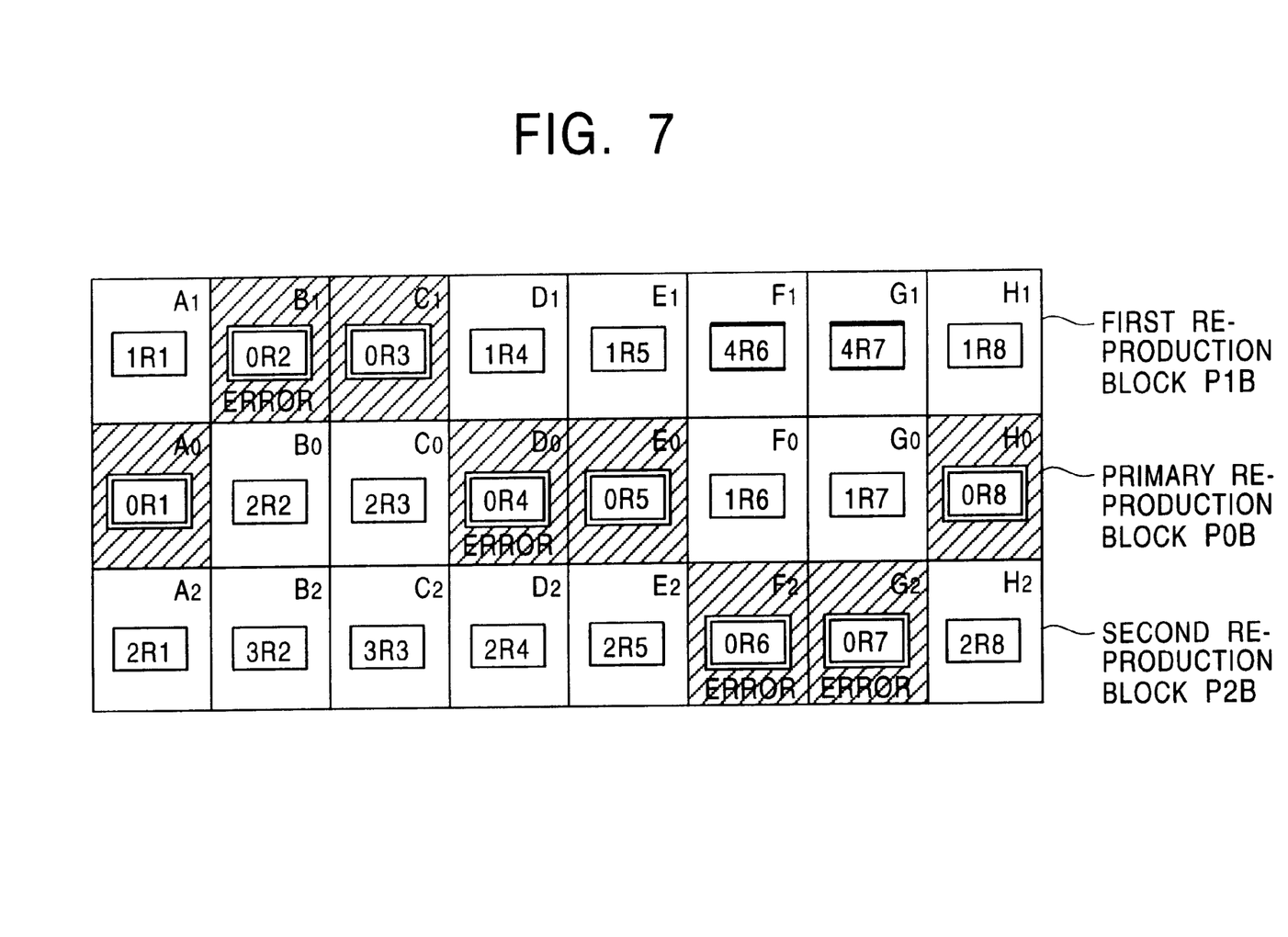
FIG. 7 is a drawing showing blocks reproduced and re-reproduced by an information reader according to the present invention.

FIG. 7 shows blocks obtained by performing three times the reproduction of blocks on the desired recording track 0R (shown in FIG. 6) along the primary reproduction track P1, and the first and second re-reproduction tracks P1 and P2. The primary reproduction track P1, and the first and second re-reproduction tracks P1 and P2 correspond to a primary reproduction block P0B, and first and second re-reproduction blocks P1B and P2B, respectively.

As shown in FIG. 7, in the primary reproduction block P0B corresponding to the primary reproduction track P0, reproduction from bit sequences 0R1, 2R2, 2R3, 0R4, 0R5, 1R6, 1R7, and 0R8 is performed. Among these bit sequences, the bit sequences 2R2, 2R3, 1R6, and 1R7 are detected as errors by the error detector 8, using track-identification information units 16 on the desired track 0R, and are ignored from information to be corrected. The other bit sequences 0R1, 0R4, 0R5, and 0R8 are left as information to be corrected. Although the bit sequence 0R4 is out of the magnetically reproducible areas A0 to H0 on the primary reproduction track P0, and includes an error, it is treated as a bit sequence in which an error was corrected by the error detector 8 because it is on the correct track.

In the primary reproduction block P0B, reproduction from the bit sequences 0R2, 0R3, 0R6, and 0R7 cannot be performed. Accordingly, by using the information reader 10 to rewind the magnetic tape 5 so that a portion of the magnetic tape 5 which has the primary reproduction track P0 returns, and performing the fine adjustment of the reproduction head tip 7 of the fixed magnetic head in the widthwise direction of the magnetic tape 5, first re-reproduction is performed, whereby reproduction from the first re-reproduction block P1B corresponding to the first re-reproduction track P1 is performed.

In the first re-reproduction block P1B, reproduction from the bit sequences 1R1, 0R2, 0R3, 1R4, 1R5, 4R6, 4R7, and 1R8 is performed. Among these bit sequences, the bit sequences 1R1, 1R4, 1R5, 4R6, 4R7, and 1R8 do not correspond to the desired track, and are ignored from information to be corrected, similar to the primary reproduction. Although the bit sequence 0R2 is out of the magnetically reproducible areas A1 to H1 on the first re-reproduction track P1, it is treated as a bit sequence including an error corrected by the error detector 8. Therefore, the bit sequences 0R2 and 0R3 are left as information to be corrected.

The bit sequences 0R6 and 0R7 cannot be still obtained. Accordingly, by performing second re-reproduction similarly to the first re-reproduction, the second re-reproduction block P2B is obtained. At this time, the bit sequences 2R1, 3R2, 3R3, 2R4, 2R5, 0R6, 0R7, and 2R8 are obtained. The bit sequences other than the bit sequences 0R6 and 0R7 do not correspond to the desired track, and are ignored from information to be corrected. Although the bit sequences 0R6 and 0R7 are out of the magnetically reproducible areas A2 to H2 on the second re-reproduction track P2, and include errors, they are treated as bit sequences in which errors were corrected by the error detector 8.

From the foregoing description, it is understood that all the bit sequences recorded on the recording track 0R can be obtained without errors from the blocks P0B, P1B, and P2B. Accordingly, by selecting the bit sequences 0R1 to 0R8 from a plurality of blocks, and performing re-formation, a block composed of correct information units on the track 0R (shown in FIG. 6) can be restored.

The foregoing description shows the case where the error corrector 8 has an error correcting function. However, also in the case where the error corrector 8 has only an error detecting function, similar information correction may be performed. Since the second case differs from the first case in that the number of times of re-reproduction increases, a description of the second case is omitted.

Figure 8:
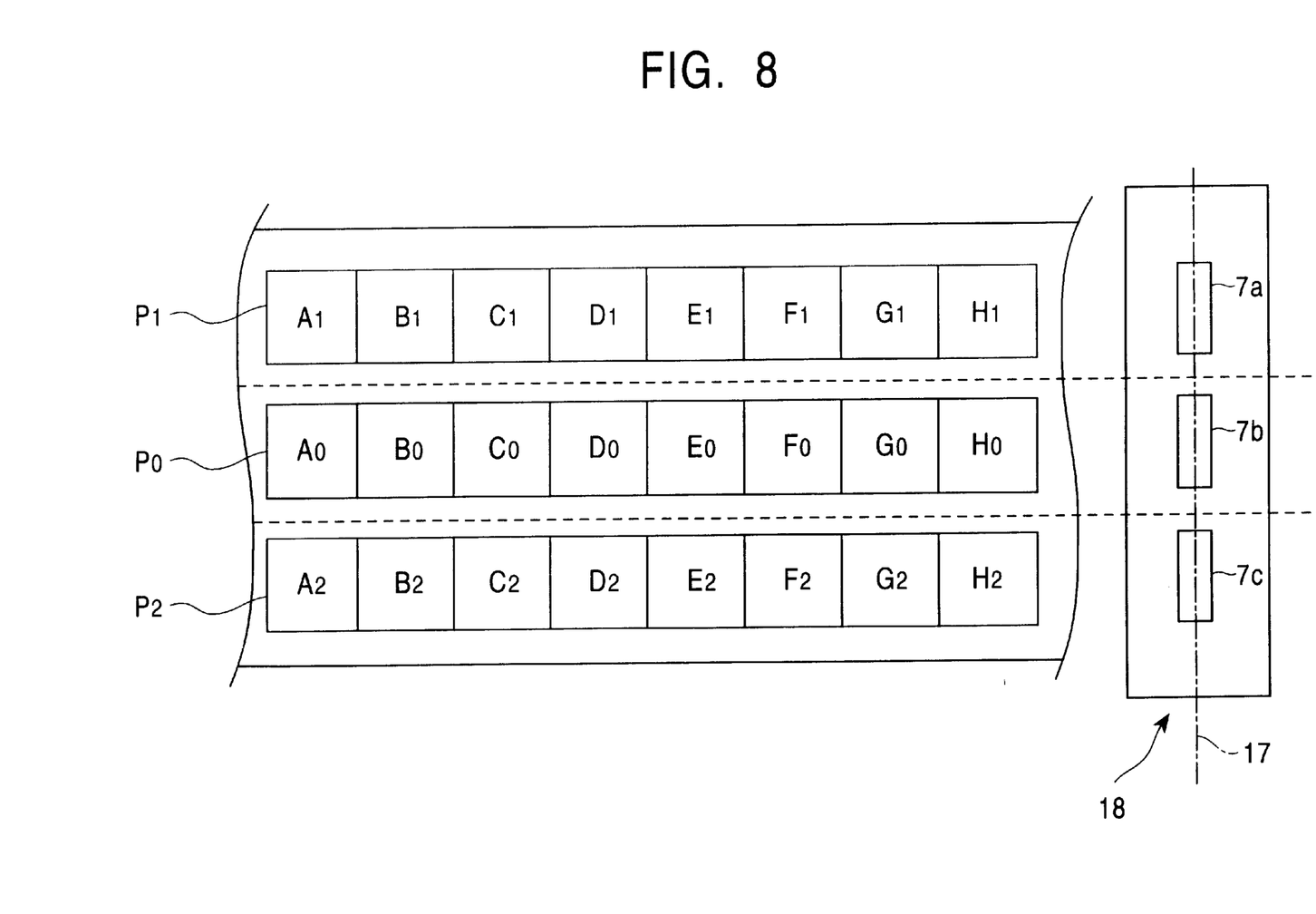
FIG. 8 is a structural drawing showing a multiblock simultaneous reproducer according to the present invention.

With reference to FIG. 8, a multiblock simultaneous reproducer 18 is described below.

In the restoration process by the information corrector 11, by associatively moving reproduction head tips 7a, 7b, and 7c on a virtual associative axis 17 so that reproduction from the blocks recorded on the magnetic tape 5 along the primary reproduction track P1, and the first and second re-reproduction tracks P1 and P2 is performed, the number of times of reproduction is reduced to one. Accordingly, the block restoration time by the information corrector 11 can be reduced to be less than that in the case where single-head-tip reproduction is used.

Figure 9:
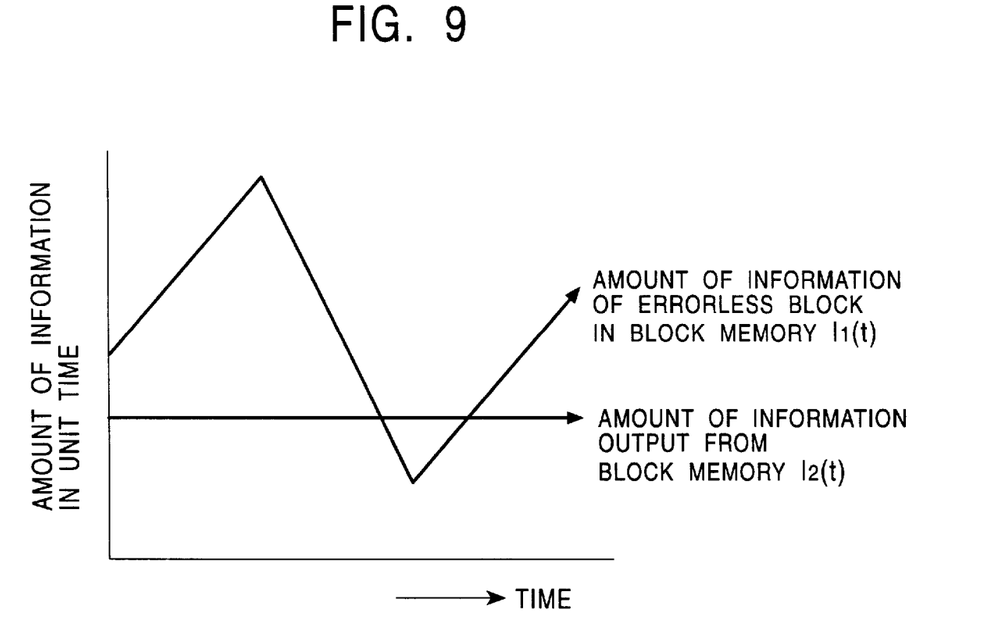
FIG. 9 is a graph showing the operation of an output timing adjuster according to the present invention.

With reference to FIGS. 4 and 9, the output timing adjuster 13 is described below.

As described above, the output timing adjuster 13 is applied to only the case where the information units of a digital signal as the restored original information are output at a predetermined cycle and in a predetermined order.

A block as to which the process has determined in step S3 (shown in FIG. 5) that information units must be output from the output unit 12 at a predetermined cycle and in a predetermined order is sent to the output timing adjuster 13.

The output timing adjuster 13 restores the sent block as the original information, whose information units are output at the predetermined cycle and in the predetermined order.

FIG. 9 uses a horizontal axis and a vertical axis to represent time and the amount of information per unit time, respectively, and shows I1(t), the amount of errorless block generated by the block storer 9 per unit time, and I2(t), the amount of information read at a predetermined cycle and in a predetermined order from the block storer 9 to the output unit 12 by the output timing adjuster 13.

When the operation start time of the magnetic reproduction apparatus 6 is represented by 0, an arbitrary time is represented by t, a value obtained by integrating I1(t) when 0 to t is represented by II1t, and a value obtained by integrating I2(t) when 0 to t is represented by II2t, by controlling I1(t) with respect to storage capacity M of the block storer 9 so that the relationship $$M > II1t - II2t \text{ where } II1t > II2t$$

is established, the information units of a digital signal as the original information can be always output at a predetermined cycle and in a predetermined order by the output unit 12 because sufficient information units to be output remain in the block storer 9, even if errors occur to interrupt block restoration for re-reproduction by the information corrector 11 (shown in FIG. 4).

In the case where there is a possibility of II1t<II2t in the information corrector 11, in other words, in the case where there is a possibility that sufficient information units to be output at a predetermined cycle and in a predetermined order cannot be supplied since the number of times of re-reproduction is greatly large and subsequent blocks cannot be restored, an upper limit of the number of times of re-reproduction is set, and if the number of times of re-reproduction exceeds the upper limit, information units in the block may be corrected by using an average value of the information units which is obtained using other preceding and subsequent information units.

The above-described embodiment describes the magnetic reproduction apparatus 6 using the reproduction head tip 7 and the magnetic tape 5, as an information reproduction apparatus according to an embodiment of the present invention. However, the present invention is not limited to the foregoing embodiment, but may be applied to, for example, an information reproduction apparatuses that reproduces magnetically or optically recorded information from a disk recording medium.

What is claimed is:

1. An information reproduction apparatus for reproducing original information from a record medium in which the information it recorded a plurality of tracks, the apparatus comprising:

information reading means for reading information as blocks each error detection of a plurality of information units, with each information unit having a bit to enable Eros detection and a track identification unit, from a recording medium on which information divided into said information units is recorded in the plurality of longitudinal tracks, and including control means to ensure that the information recorded on said recording medium is read from a selected track;

block storage means form storing said blocks read by said information reading means;

error detecting means for detecting an error in each information unit in a block reproduced from the selected track and stored in said block storage means; and information correcting means wherein when an information-unit error in one of said blocks is detected by said error detecting means, said information correcting means uses said information reading means to perform re-reading from a first block corresponding to the one block having said information-unit error from a track on one side of the selected track and from a second block corresponding to the one block from a track on the other side of the selected track, and said information correcting replaces all information units having an error in the one block having said information-unit error by corresponding information units from the first block and the second block, and outputting the one block having said information with corrected information units.

2. An information reproduction apparatus according to claim 1, wherein said block storage means outputs the stored information units in an order recorded on said recording medium and at a predetermined cycle, and includes an output timing adjustment means for restoring said original information.

3. An information reproduction apparatus according to claim 1, wherein said information reproduction apparatus is one of a magnetic reproduction apparatus and an optical reproduction apparatus.

4. An information reproduction method for reproducing original information from a record medium in which the information is recorded in a plurality of tracks, the method comprising the steps of:

selecting a primary track o the plurality of tracks for reading out;

controlling a read-out bead so that the information recorded on he record medium is read out from the primary track; reading out from the primary track of the recorded medium information as blocks, each block composed of a plurality of information units, with each information unit having a bit to enable error detection and a track identification unit, storing the blocks of information read out in said step of reading out;

detecting errors in each information unit of the blocks of the primary track stored in said step of storing;

upon detecting an error in a block in said step of detecting, reading out from a track on one side of the primary track the information units in a first block corresponding to the block in the primary track in which the error was detected and reading out from a track the other side of the primary track the information units in a second block in the primary track in which the error was detected;

storing information units present in the first block;

storing information units present in the second block;

identifying information units belonging to the primary track present in the first block;

identifying information units belonging to the primary track present in the second block;

assembling the block in the primary track in which errors were detected by adding the information units identified in said steps of identifying;

correcting all detected errors; and outputting the error-corrected plurality of information units.

5. An information reproduction apparatus for reproducing original information from a record medium in which the information is recorded in plurality of side-by-side tracks, the apparatus comprising;

information reading means information as blocks, each block composed of a plurality of information units, with each information unit having a bit to enable error detection and a track identification unit, simultaneously from three tracks, wherein a primary block is read from a primary track, a first block read from a track on one side of the primary track, and a second block from a track on the other side of the primary track;

block storage means for storing the primary block, the first block, and the second block from the information reading means;

error detecting means for detecting an error in each information unit of the primary block stored in said block storage means;

information correcting means identifying information units of the first block and of the second block stored in said block storage means belonging to the primary block stored in said storage means, upon said error deleting means detecting an error in the primary block, and form assembling the information units of the primary block from the primary block and the first and second blocks and outputting the assembled primary block.

* * * * *